May 13, 1969     P. C. ROSENBERGER     3,443,673
HYDRAULIC AND SPRING CLUTCH RELEASE BOOSTER
Filed Sept. 6, 1967     Sheet 1 of 2
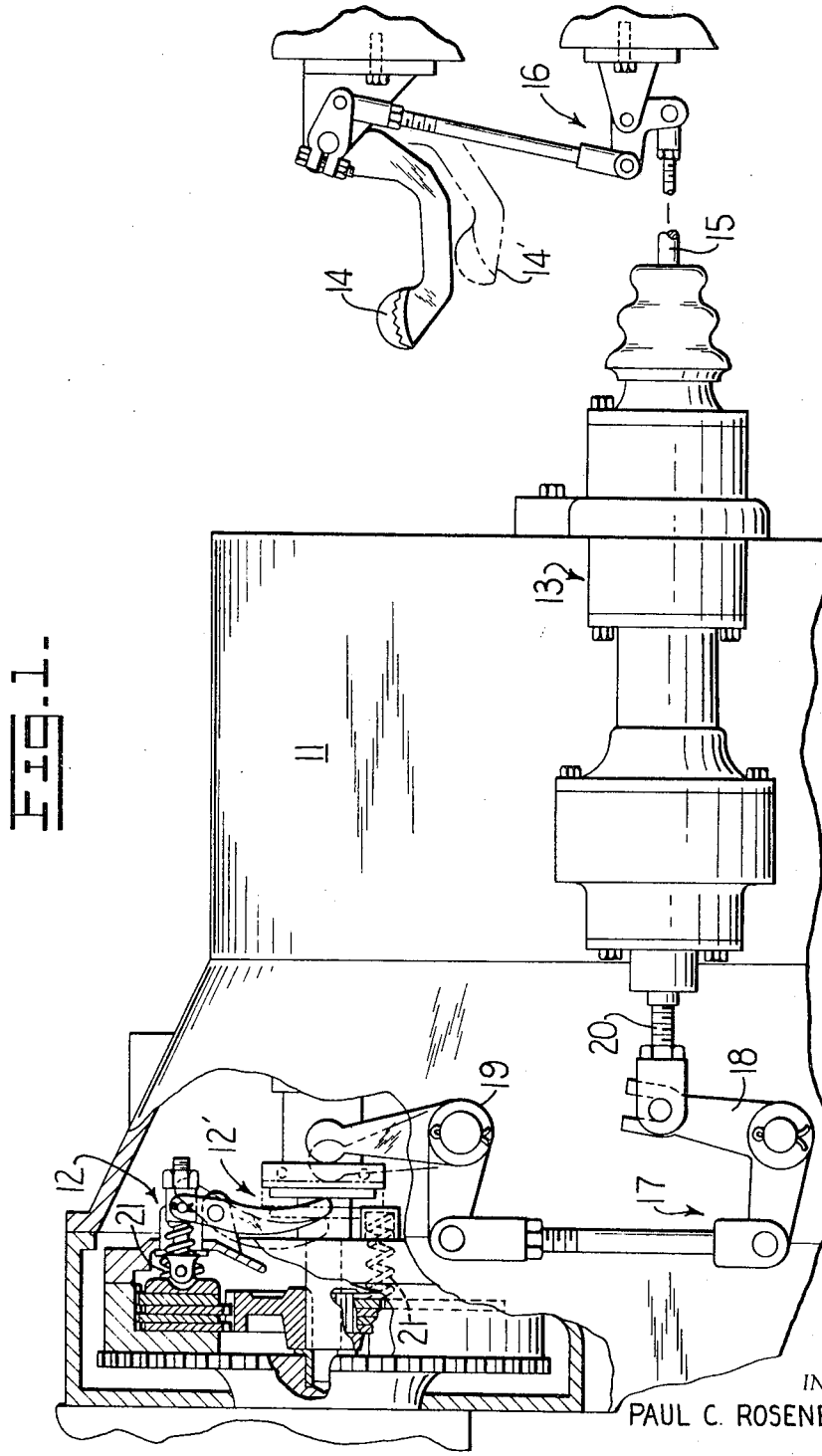
INVENTOR.
PAUL C. ROSENBERGER
BY
ATTORNEYS

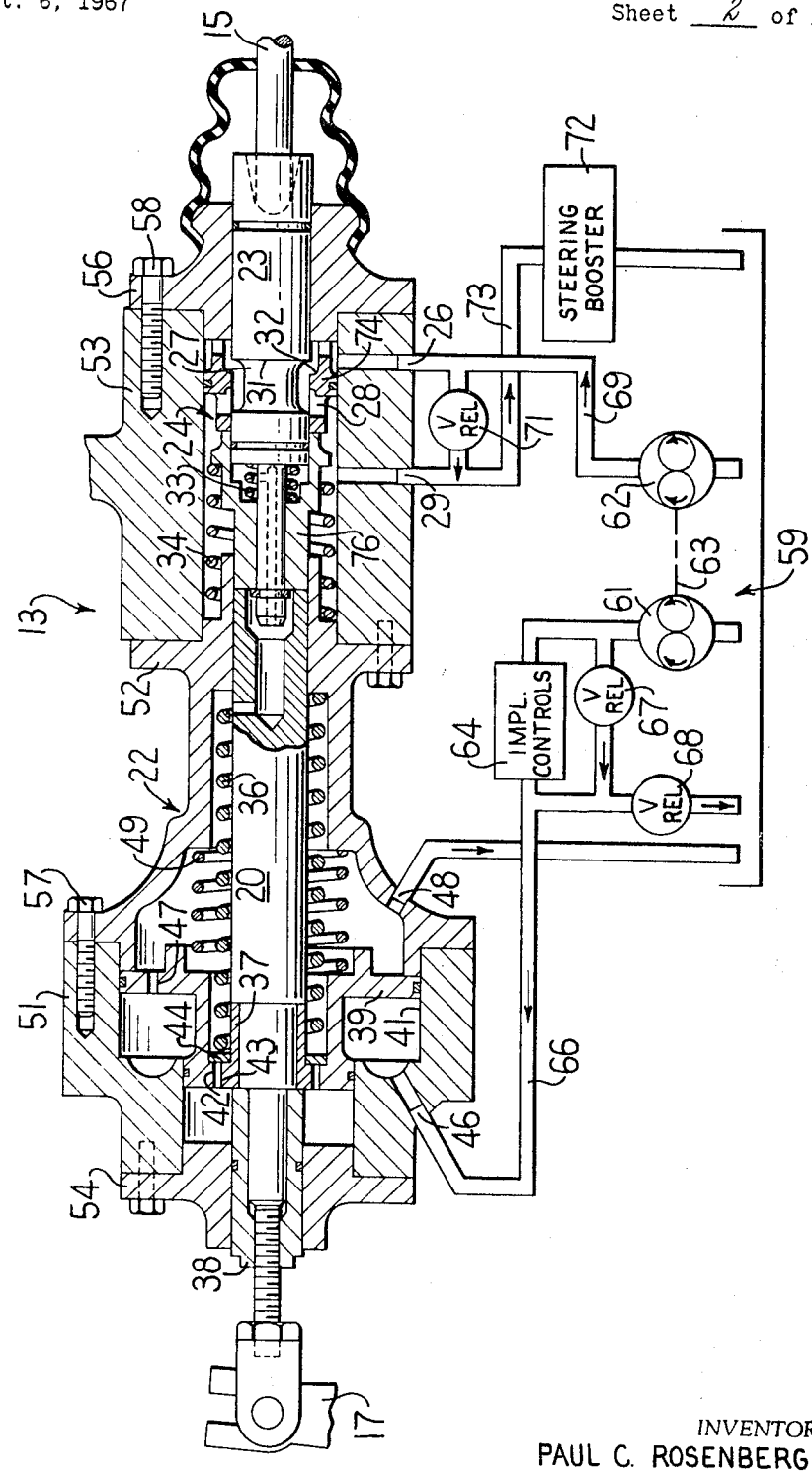

United States Patent Office 3,443,673
Patented May 13, 1969

3,443,673
HYDRAULIC AND SPRING CLUTCH RELEASE BOOSTER
Paul C. Rosenberger, Decatur, Ill., assignor to Caterpillar Tractor Co., Peoria, Ill., a corporation of California
Filed Sept. 6, 1967, Ser. No. 665,921
Int. Cl. F16d 25/08
U.S. Cl. 192—91     8 Claims

ABSTRACT OF THE DISCLOSURE

A hydraulic clutch booster including a spring to reduce clutch operating effort in the event of a hydraulic pressure failure. The booster has a control rod through which force is transmitted to operate the clutch and the spring is disposed to act upon the rod. Hydraulic fluid exerts pressure against a piston which is disposed in biasing relation to the spring to prevent action of the spring upon the control rod. To permit operation of the control rod in the event of a hydrostatic lock in the booster actuating hydraulic fluid, a two-piece actuating piston is associated with the booster control rod. A first actuating piston portion transmits hydraulic actuating force to the control rod while a second portion of the actuating piston is separable from the first portion to directly transmit mechanical force to the booster control rod.

---

Hydraulic boosters are commonly employed to assist or reduce operator effort, for example, where mechanical force is required to disengage a vehicular clutch. However, such hydraulic boosters are susceptible to pressure failure of the actuating hydraulic fluid particularly prior to engine startup or upon inadvertent and suddent stopping of the engine. It is necessary to provide some means for disengagement of the clutch by the operator during such conditions. A direct mechanical connection between the control pedal and the clutch is generally undesirable because of the substantial force required for disengagement of the clutch. A common solution has been the use of fluid accumulators and complementing circuitry in the hydraulic booster to store hydraulic fluid pressure and to assist the operator in machine control during such emergencies. Such accumulator circuits, however, are generally costly and add to the size of the hydraulic booster assembly.

The present invention overcomes the above problems by providing simple mechanical means within the hydraulic booster itself which act automatically to constantly permit reduced clutch operating effort. Spring means are disposed within the hydraulic booster and tend to exert a mechanical force to assist in the operation of the booster. The spring is biased by means of hydraulic fluid pressure such that effective operation of the spring means occurs only during a pressure failure of the hydraulic fluid.

The present hydraulic booster preferably comprises a two-piece valve for transmitting actuating force to the booster according to operator control means. A first valve portion is operable to transmit actuating hydraulic fluid pressure to the booster. To permit operator control through the booster even when the first valve portion is immobilized by a hydrostatic lock, a second valve portion transmits mechanical force from the operator control means through the hydraulic booster.

Other features and advantages of the present invention are made apparent from the following description and the accompanying drawings wherein FIG. 1 is a side view, with parts broken away and parts in section, of a vehicular power train employing the present clutch booster, and FIG. 2 is a longitudinal sectional view of the hydraulic booster to illustrate the features provided by the present invention.

A vehicular power train which may be employed for example with motor graders is illustrated in FIG. 1 and includes a power shift transmission 11 coupled with an oil flywheel clutch 12. A hydraulic booster 13 is connected to a control pedal 14 through an extension 15 and control pedal linkage 16 and has a control rod 20 connected to the clutch assembly by means of a clutch linkage 17 including two bellcranks 18 and 19. During clutch disengaging operation, the control pedal is depressed to its phantom position 14' which exerts a mechanical force upon the hydraulic booster through the control pedal linkage. The booster responds by leftward shifting of its control rod causing counter-clockwise rotation of the clutch linkage bellcranks to disengage the clutch in a conventional manner. Disengagement of the clutch is represented by its phantom position 12'. When the control pedal is released, the clutch and booster are returned to their normal operating positions by load springs 21 in the clutch assembly.

To describe the hydraulic booster in detail with reference to FIG. 2, the control rod 20 which is connected to the clutch linkage is disposed in a booster housing 22 and a control spool 23 which is connected to the spool extension 15 is in axial alignment at the right end thereof. An actuating piston 24 is interposed between the control spool and the control rod to transmit hydraulic fluid pressure to the control rod and cause it to shift leftwardly against the clutch linkage when the control spool is shifted leftwardly according to depression of the control pedal 14 of FIG. 1. During normal operation while the clutch is engaged, actuating hydraulic fluid enters the booster housing through a port 26, flows into an annular groove 27 of the control spool and then through a port 28 of the actuating piston to depart the booster housing by means of an outlet port 29. As the control spool is shifted leftwardly in response to depression of the control pedal, a land 31 at the right side of the annular groove in the control spool moves into throttling relation with a shoulder 32 of the actuating piston so that the hydraulic fluid entering through the inlet port 26 builds up pressure against the right end of the actuating piston. This hydraulic fluid pressure buildup causes leftward shifting of the actuating piston and accordingly of the control rod 20 for disengagement of the clutch. When the control pedal is returned to its normal raised position, the control spool is against shifted rightwardly releasing the hydraulic fluid at the right end of the actuating piston and permitting it to exit the booster housing through the outlet port 29. In the absence of hydraulic actuating fluid pressure, the springs in the clutch assembly return it to its engaged position (see FIG. 1) and cause the control rod 20 to assume its normal rightward position in the booster housing. With the clutch in its engaged position, the position of the actuating piston is controlled by a pair of springs 33 and 34 which are respectively positioned between the actuating piston and the control spool and between the booster housing and the actuating piston.

To provide for reduced clutch operating effort, a spring 36 is disposed to interact between the booster housing and a flanged sleeve 37 which is secured upon the control rod by an end sleeve 38 which is threaded onto the left end of the control rod. The spring 36 is thus disposed to urge the control rod leftwardly and assist in disengagement of the clutch. To prevent the action of the spring upon the control rod except during a hydraulic fluid pressure failure, a biasing piston 39 is disposed in an enlarged bore 41 of the booster housing. The spring 36 acts against either or both a flange 42 on the biasing piston and a flange 43 on the sleeve 37 by means of an annular spring seat 44. Hydraulic fluid is introduced into the biasing piston bore through an inlet port 46 to urge the biasing piston rightwardly against the spring 36. A port 47 is provided in the biasing piston to permit bleed-off of the hydraulic fluid to the right side of the biasing piston from where it exits the booster housing through an outlet port 48. During normal operation, the spring 36 will not interact with the control rod since hydraulic fluid pressure will exist in the biasing piston bore 41 to urge the biasing piston and the spring seat 44 rightwardly to maintain the spring 36 in a compressed condition.

However, in the event of a hydraulic fluid pressure failure, fluid in the biasing piston bore will be dissipated through the orifice 47 and the biasing piston and spring seat will be permitted to move leftwardly. This leftward motion of the biasing piston permits the spring 36 to act against the control rod through the spring seat 44, the flanged sleeve 37, and the end sleeve 38 to reduce the operator effort necessary to shift the control rod leftwardly and disengage the clutch. The strength of the spring 36 is selected to reduce the operator effort in disengaging the clutch assembly by approximately 75%. Although a larger booster spring could also be readily employed, 25% of the spring force is preferably retained for loading of the clutch to facilitate push starting of the vehicle, etc. Also to insure that the full force of the spring 36 acts upon the control rod, an auxiliary spring 49 is interposed between the booster housing and the biasing piston. The auxiliary spring 49 is relatively weak and serves the purpose of shifting the biasing piston leftwardly in the event of a hydraulic fluid pressure failure.

To facilitate installation of the hydraulic booster where space is limited, the housing is constructed in three sections 51, 52 and 53 with varying bores to receive the internal components of the booster. The housing also has end plates 54 and 56 at each end thereof with the end plates and housing section secured together by cap screws. Long cap screws 57 and 58 are employed at two housing junctures to facilitate assembly of springs in the booster. During installation, the booster components are assembled, then the end sleeve 38 is backed off to permit the inner sleeve 37 to abut the end plate 54 at the left end of the booster housing. The long cap screws 57 and 58 are then employed to draw the housing together and compress springs 34, 36 and 49 to an initial preload condition. At this point, the booster housing is reduced to a length permitting it to be readily installed and connected to the clutch and control pedal actuating linkages. The springs 36 and 49 are then compressed to full preload conditions by threading the end sleeve 38 rightwardly onto the control rod to axially secure the inner sleeve 37 in place.

To provide actuating hydraulic fluid to the inlet port 26 and to provide biasing hydraulic fluid to the inlet port 46, a hydraulic pump 59 has two pump sections 61 and 62 which are driven through a single shaft indicated by the center line 63. The left pump section 61 provides hydraulic fluid for operation of implement controls 64 associated with the motor grader and provides hydraulic fluid to the inlet port 46 by means of a conduit 66. A relief valve 67 disposed in parallel with the implement control is set for maximum relief at 1800 p.s.i. to insure that pressure of the hydraulic fluid in the implement controls does not exceed that value. An outlet relief valve 68 communicates with the conduit 66 between the implement control and the inlet port 46 and has a maximum relief setting of 50 pounds per square inch to limit the pressure of hydraulic fluid in the biasing piston bore 41 at the value.

The second pump section 62 provides actuating hydraulic fluid to the booster through the inlet port 26 by means of a conduit 69. A relief valve 71 is disposed in parallel with the inlet port 26 and the outlet port 29 and has a minimum differential pressure setting of 300 pounds per square inch to limit that amount of pressure for operation of the actuating piston 24. Hydraulic fluid from the outlet port 29 and from the relief valve 71 is then communicated to a steering booster 72 by means of a conduit 73. The steering booster includes relief valve means (not shown) having a maximum relief setting of 1800 pounds per square inch to assure that that pressure is not exceeded in the steering booster.

With the above configuration, a hydraulic lock may occur in the steering booster, for example, upon inadvertent and sudden stopping of the engine, which would cause very high balanced hydraulic pressure to exist at both the inlet and outlet ports 26 and 29 and tend to prevent motion of the actuating piston. To prevent immobilization of the entire actuating piston and to permit the operator to mechanically effect disengagement of the clutch during such a hydraulic lock condition, the actuating piston is constructed in two parts 74 and 76. The first piston part 74 acts in throttling relation with the control spool 23 and is susceptible to immobilization by the hydraulic lock discussed above. The second actuating piston portion 76 is separable from the first piston portion but interacts with the first piston portion during normal booster operation to transmit hydraulic pressure to the control rod and shift the control rod leftwardly for disengagement of the clutch. However, when the above discussed hydraulic lock occurs, the second piston portion 76 is separable from the first piston portion and permits the operator to exert direct mechanical force through the control spool 23 and the separable piston portion 76 to the control rod for disengagement of the clutch.

I claim:

1. A hydraulic booster operatively interposed between control linkage and a clutch assembly tending toward an engaged condition, comprising:

hydraulic means responsively associated with the control linkage for acting upon the clutch to disengage it, a member associated with the control linkage and clutch, the member being effective to provide a mechanical coupling therebetween for disengaging the clutch by operation of the linkage, spring means associated with the member and acting thereupon with a tendency to disengage the clutch, and means associated with the spring means and responsive to hydraulic fluid pressure to exert biasing force upon the spring means and substantially check action on the spring means upon the member except in the absence of hydraulic fluid pressure.

2. The hydraulic booster of claim 1 enclosed within a housing, the member being a control rod reciprocably disposed in the housing, the hydraulic means acting upon the clutch through the control rod, the spring means being at least one spring arranged in colinear relation with the control rod, the biasing means comprising a piston associated with the spring and further comprising for introducing hydraulic fluid pressure against the piston.

3. The hydraulic booster of claim 2 wherein the spring and piston are arranged in coaxial relation with each other and with the control rod.

4. The hydraulic booster of claim 3 wherein:

said booster spring tends to exert a force upon the control rod which is less than the force necessary to effect disengagement of the clutch, said biasing piston has an orifice associated therewith for regulating flow to drain off the hydraulic fluid received by said piston, and said biasing piston has an auxiliary spring acting thereagainst and tending to remove the biasing effect of said piston from said booster spring.

5. The hydraulic booster of claim 4 wherein the control rod has a flange surface and said biasing piston has a flange surface in concentric, adjacent relation thereto, a spring seat is disposed to rest jointly and separately on the two flanges and said booster spring is disposed against said spring seat.

6. The hydraulic booter of claim 5 having a housing comprising an end plate through which the control rod penetrates for engagement with the clutch and multiple additional housing sections with at least two of the sections secured together by long cap screws and wherein, said control rod flange is disposed on a sleeve free for longitudinal motion on the control rod, and an end sleeve is threaded upon the control rod for engagement with the free sleeve opposite to the booster spring.

7. The hydraulic booter of claim 3 where the booster has an actuating piston and a control spool with the control spool operable to direct hydraulic fluid against the actuating piston for force transmission therethrough to the control rod and to directly transmit mechanical force from the control spool to the control rod, hydraulic fluid communicated to the actuating piston being susceptible of a hydraulic lock downstream of the actuating piston, wherein the actuating piston is of two piece construction and comprises a first portion for transmitting fluid pressure to the control rod and a second portion separable from the first portion for transmitting mechanical force from the control spool to the control rod, said first actuating piston portion being susceptible to immobilization upon occurrence of the hydraulic lock.

8. The hydraulic booter of claim 7 wherein a first pump communicates hydraulic fluid to the actuating piston of the booster and a steering booster downstream thereof and a second pump, having drive means in common with the first pump, communicates hydraulic fluid to the biasing piston.

References Cited

UNITED STATES PATENTS

| 2,144,074 | 1/39 | Maybach | 192—.076 |
| 3,245,502 | 4/66 | Randol | 192—.075 |
| 3,379,291 | 4/68 | Randol | 192—101 X |
| 3,292,751 | 12/66 | McRay et al. | 192—91 X |

BENJAMIN W. WYCHE III, *Primary Examiner.*

U.S. Cl. X.R.

192—83, 89, 101